United States Patent
Oomkes

(10) Patent No.: US 6,642,824 B2
(45) Date of Patent: Nov. 4, 2003

(54) MAGNETIC ENCODER WITH SNAP ACTION SWITCH

(75) Inventor: Daniel Lee Oomkes, Grand Rapids, MI (US)

(73) Assignee: Goodrich Avionics Systems, Inc., Grand Rapids, MI (US)

( * ) Notice: Subject to any disclaimer, the term of this patent is extended or adjusted under 35 U.S.C. 154(b) by 0 days.

(21) Appl. No.: 10/021,846

(22) Filed: Dec. 13, 2001

(65) Prior Publication Data

US 2002/0067159 A1 Jun. 6, 2002

Related U.S. Application Data

(62) Division of application No. 09/493,165, filed on Jan. 27, 2000, now Pat. No. 6,556,005.

(51) Int. Cl.[7] .................................................. H01H 9/00
(52) U.S. Cl. ...................................... 335/207; 200/404
(58) Field of Search ......................... 200/404; 335/205, 335/206, 207

(56) References Cited

U.S. PATENT DOCUMENTS

| | | | |
|---|---|---|---|
| 3,597,714 A | * | 8/1971 | Visconti Brebbia et al. 335/207 |
| 3,644,856 A | * | 2/1972 | Scott ........................... 335/207 |
| 3,815,066 A | | 6/1974 | Vinal |
| 3,858,145 A | | 12/1974 | Sulich et al. |
| 4,086,519 A | | 4/1978 | Persson |
| 4,131,033 A | * | 12/1978 | Wright et al. .................. 74/553 |
| 4,303,856 A | | 12/1981 | Serras-Paulet |
| 4,307,617 A | | 12/1981 | Greer et al. |
| 4,342,975 A | | 8/1982 | Charpentier |
| 4,495,547 A | * | 1/1985 | Stoverock .................... 361/782 |
| 4,514,819 A | | 4/1985 | Punater et al. |
| 4,829,248 A | | 5/1989 | Loubier |
| 4,897,914 A | | 2/1990 | Loubier |
| 4,942,394 A | | 7/1990 | Gasiunas |
| 5,170,313 A | | 12/1992 | Miller et al. |
| 5,233,355 A | | 8/1993 | Di Stefano et al. |
| 5,248,939 A | | 9/1993 | Brauer |
| 5,313,159 A | | 5/1994 | Allwine, Jr. |
| 5,581,058 A | * | 12/1996 | Javery et al. ................... 200/4 |
| 5,623,854 A | * | 4/1997 | Snider .......................... 74/553 |
| 5,965,878 A | | 10/1999 | Vircks |
| 6,154,201 A | * | 11/2000 | Levin et al. ................. 345/184 |

FOREIGN PATENT DOCUMENTS

| | | | | |
|---|---|---|---|---|
| EP | | 0749138 A1 | 12/1995 | |
| JP | | 5314854 | 11/1993 | |
| JP | | 2001109558 A | * 4/2001 | ............. G06F/3/02 |

* cited by examiner

*Primary Examiner*—Elvin Enad
*Assistant Examiner*—Bernard Rojas
(74) *Attorney, Agent, or Firm*—Calfee, Halter & Griswold

(57) ABSTRACT

The disclosure is directed to an encoder apparatus that is capable of resolving magnetically axial and/or rotational displacements of a knob shaft thereof independently and includes a magnetic snap action switch, and a method of assembling the same. In one embodiment, the encoder apparatus has application as a display controller. In another embodiment, one or more of the encoder assemblies may be integrated into a bezel of a display for controlling the operations thereof.

17 Claims, 10 Drawing Sheets

MAGNETIC ENCODER WITH SNAP ACTION SWITCH

This application is a divisional patent application of U.S. patent application Ser. No. 09/493,165, filed Jan. 27, 2000, which issued as U.S. Pat. No. 6,556,005 on Apr. 29, 2003.

BACKGROUND OF THE INVENTION

The present invention is directed to encoder apparatus, in general, and more particularly, to an encoder capable of resolving magnetically axial and/or rotational displacements independently and including a magnetic snap action switch.

Generally, encoder switches for use in avionics, like for controlling various functions of a display disposed on a cockpit panel, for example, are operative in a severe environment of shock and vibration while maintaining the intended accuracy and resolution, especially over a wide temperature range. As more and more avionic instruments are included on the cockpit panel to assist the pilot during flight, there is a continuing push to make the instruments and their corresponding control switches smaller while improving upon the accuracy and resolution thereof. In some instances, it may be desirable to combine functionality of two devices into one to reduce size and weight. This is no easy chore considering the stressful environment and wide temperature ranges over which these devices are intended to operate with high resolution and accuracy.

For example, well known AB switch encoders are used to control avionic instruments through rotational movement of the switch. These type encoder switches operate on a purely digital basis. Generally, two magnetic sensors are disposed within the switch in a quadrature orientation about either a cogged wheel or a multiple pole permanent magnet that is attached to the switch shaft and rotated past the magnetic sensors. Each sensor produces a pulsed train signal A and B in quadrature to the other in response to the shaft rotation. The angular position and direction of rotation of the switch is resolved by encoding the pulsed signal trains A and B. In order to improve the resolution of these type switches, more cogs may be added to the wheel or more magnetic poles added to the permanent magnet. This may not result in a problem in and of itself, but to increase density and also reduce the size of the switch introduce alignment difficulties in sensing the angular position of the shaft at the desired resolution. In the environment of an aircraft, for example, the shock and vibration may cause a change in the alignment of the sensor with respect to the more closely spaced cogs or magnetic poles to render an error in angular position. Thus, improvement in this area is considered desirable.

Moreover, optical encoders are being proposed for use as an alternative sensing mechanism to their magnetic counterparts. While these optical devices may offer better resolution, they are much more sensitive to alignment and do not appear to be a viable alternative to magnetic sensing, especially over the wide operational temperature ranges of an aircraft not to mention the severe vibration and shock environments thereof. In addition, the packaging of these optical encoders are not currently designed to provide the necessary protection over the wide operating temperature ranges of an aircraft environment.

Devices that are used to detect axial displacement of the switch shaft, like push switches, for example, currently use a flexible domed element in the base of the switch to offer a "snap action" feel to the operator. When the switch is depressed, the bottom of the shaft makes contact with and flexes the top of the domed element and when the switch is released, the domed element flexes back to its original shape forcing the shaft to spring upward. Over time and with use, the mechanical domed element loses elasticity or collapses in shape, thus causing a loss in the "snap action" feel. This is another area where improvement appears desirable.

As has been indicated above, there is also a push to combine functionality in these avionic control switches and as a result of this push, it is desired to combine the functions of axial and rotational displacement in the same assembly with an improved resolution and accuracy. A multifunctional encoder of this type with improved resolution would be considered an advance to the current state of the art of encode type switching and very desirable. Accordingly, the present invention intends to over come the aforementioned drawbacks of the current technology in the state of the art encoder and switching mechanisms and satisfy the packaging and performance demands for future applications, especially for avionic instruments.

SUMMARY OF THE INVENTION

In accordance with one aspect of the present invention, a switch with magnetic snap action comprises a housing, at least one permanent magnet fixedly disposed with respect to the housing in a cavity of the housing, and a knob shaft including a top portion that is slideably disposed through an opening in the housing, and a bottom portion disposed in the housing cavity and including a member comprised of a magnetically attractive material. The knob shaft is held axially in a first position by a magnetic force between the shaft member and the at least one permanent magnet in the housing cavity. The knob shaft is displaced from the first position for as long as the magnetic force is overcome by an external force applied to the knob shaft, where upon release of the external force, the knob shaft snaps back to the first position by the magnetic force. A method of assembling the switch comprises the steps of: creating a first opening in a bottom side of the housing and a cavity within the housing into which the first opening extends, creating a second opening in a top portion of the housing which extends to the cavity, the second opening being smaller in width than the first opening, affixing a flux washer around an inner periphery of the cavity through the first opening, disposing a top portion of a bushing through the first opening, the cavity and through the second opening of the housing to render a bottom portion of the bushing within the flux washer, disposing a plurality of permanent magnets into cutouts around the periphery of the bottom portion of the bushing in an annular space between the bottom portion and the flux water, and disposing a top portion of a knob shaft though the first opening, the cavity and an opening in the bushing to render a disked shaped member of a bottom portion of the knob shaft comprised of a magnetic material in juxtaposition with the bottom portion of the bushing and form a magnetic connection with the plurality of permanent magnets thereof.

In accordance with another aspect of the present invention, a switch with magnetic snap action comprises a housing, a plate of magnetically attractive material fixedly disposed at an inside periphery of a cavity of the housing, and a knob shaft including a top portion that is slideably disposed through an opening in the housing, and a bottom portion disposed in the housing cavity and including a permanent magnet. The knob shaft is held axially in a first position with respect to the housing by a magnetic force between the permanent magnet and the plate. The knob shaft is slideably displaceable from the first position for as long as the magnetic force is overcome by an external force applied to the knob shaft, whereby upon release of the external force, the knob shaft snaps back to the first position by the magnetic force.

In accordance with yet another aspect of the present invention, an encoder apparatus comprises a housing, a knob shaft including an upper portion disposed through an opening in the housing, and a lower portion disposed in a cavity of the housing and including a permanent magnet magnetized with at least one set of north-south magnetic poles, the knob shaft and its permanent magnet being rotateably moveable in the housing cavity, a plurality of magnetic filled sensors disposed within the housing cavity in proximity to the permanent magnet and distributed angularly thereabout to sense the magnet field strength of the permanent magnet based on the orientation of the permanent magnet with respect to the sensors, each sensor for generating a signal representative of the magnitude of the magnetic field strength sense thereby, and a processor for processing the sensor signals to resolve rotational movement of the knob shaft. In accordance with still another aspect of the present invention, a multifunctional encoder apparatus comprises a housing, a knob shaft including an upper portion disposed through an opening in the housing and a lower portion disposed in a cavity of a housing and including a permanent magnet magnetized with at least one set of north-south magnetic poles, said knob shaft and it's permanent magnet being axially and rotatably moveable in the housing cavity, a plurality of magnetic field sensors disposed within the housing cavity in proximity to the permanent magnet and distributed angularly thereabout to sense the magnetic field strength of the permanent magnet based on the orientation of the permanent magnet with respect to the sensors, each sensor for generating a signal representative of the magnitude of the magnetic field strength sensed thereby, and a processor for processing the sensor signals to independently resolve axial and rotational movement of the knob shaft.

In accordance with still another aspect of the present invention, a controller for a display comprises at least one multifunctional encoder including a housing, a knob shaft including an upper portion disposed through the housing opening, and a lower portion disposed in a cavity of the housing and including a permanent magnet magnetized with at least one set of north-south magnetic pulls, the knob shaft and its permanent magnet being axially and rotateably moveable in the housing cavity, and a plurality of magnetic field sensors disposed within the housing cavity in proximity to the permanent magnet and distributed angularly thereabout to sensed the magnetic field strength of the permanent magnet based on the orientation of the permanent magnet with respect to the sensors, each sensor for generating a signal representative of the magnitude of the magnetic field strength sensed thereby, and a processor governed by the sensor signals to generate control signals for controlling the display area.

DESCRIPTION OF THE PREFERRED EMBODIMENT

Figure 1A:
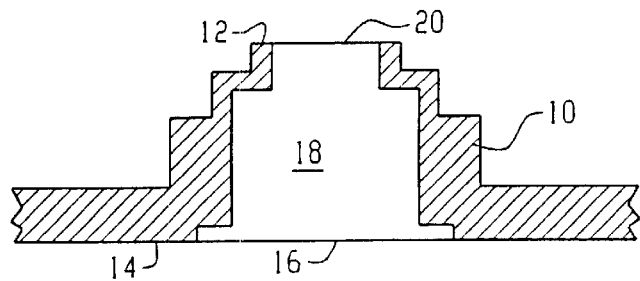
FIGS. 1A–1E are cross-sectional illustrative views of and exemplify a method of assembling a multifunctional encoder apparatus including a switch arrangement with magnetic snap action suitable for embodying the principles of the present invention.

FIGS. 1A–1E are cross sectional illustrative views of a multifunctional encoder apparatus including a switch arrangement with magnetic snap action and exemplify a method of assembling the same. In FIG. 1A is shown a housing 10 having top 12 and bottom 14 sides. A first opening 16 in the bottom side 14 and a cavity 18 are created within the housing 10. A second opening 20 is created in the top portion 12 of the housing and extends down into the cavity 18, the second opening 20 being smaller in size than the first opening 16. In the present embodiment, the first opening 16, the second opening 20, and the cavity 18 are all cylindrical in shape. However it is understood that these sections of the housing may take upon any shape without deviating from the principles of the present invention.

Figure 1B:
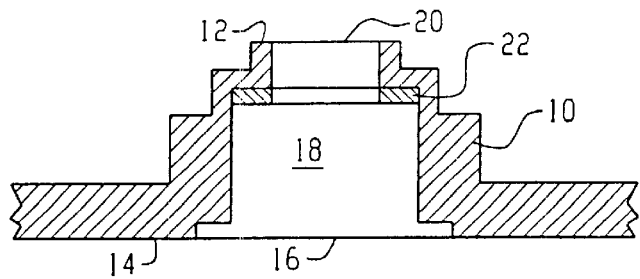
Figure 1C:
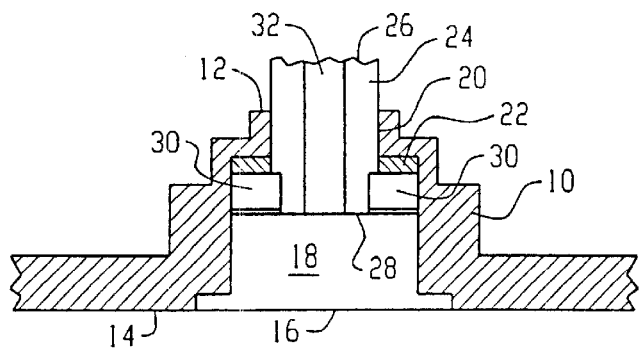

In FIG. 1B, a flux member 22 is affixed to the inner periphery of the cavity through the first opening 16 of the housing 10. The flux member 22 which may be comprised of a magnetically attractive material, such as Nickel plated, 018 cold finished Steel, for example, is shaped as a washer and may be press fitted into the cavity 18 through the opening 16. Next, as shown in FIG. 1C, a bushing 24 including a top portion 26 that is disposed through the opening 16, the cavity 18, and through the housing opening 20 extending beyond the top side 12, and a bottom portion 28 that remains in the cavity 18 and includes at least one permanent magnet. In the present embodiment, the bushing 24 accommodates a plurality of permanent magnets 30 that may be disposed through the opening 16 into cutouts around the periphery of the bottom portion 28 in an annular space between the bottom portion 28 and an inner wall of the housing cavity 18 resting against the flux washer 22. The bushing 24 also includes a hollow opening 32 centrally located and extending axially therethrough from the bottom portion 28 to the top portion 26.

Figure 2:
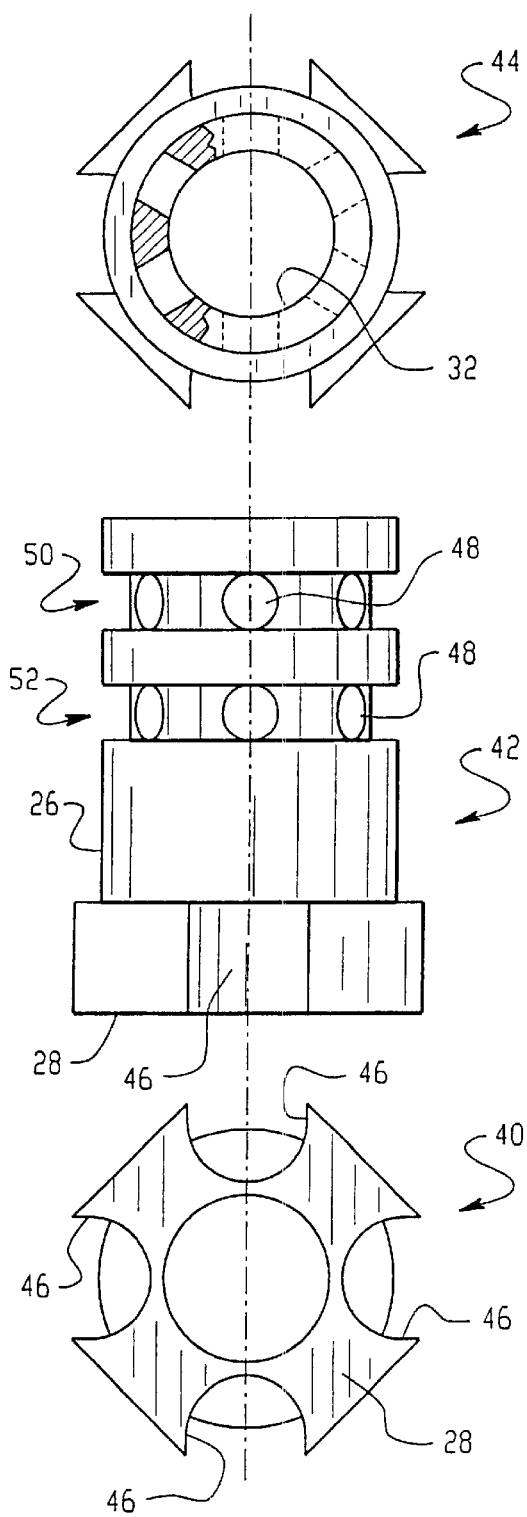
FIG. 2 depicts bottom, side and top views of a bushing suitable for use in the embodiment of FIG. 1.

A more detailed depiction of the bushing 24 is shown by the bottom 40, side 42 and top 44 views of FIG. 2. Referring to FIG. 2, the bottom portion 28 includes cut-outs 46 uniformly spaced around its periphery to accommodate the plurality of permanent magnets 30 (not shown) which are to be affixed thereto. In addition, the top portion 26 of the bushing 24 includes cut outs 48 disposed about the periphery thereof to accommodate a plurality of ball bearings (not shown). In the present embodiment, the cut outs 48 permit the ball bearings to protrude radially through the wall of the bushing and into the opening 32 as shown in the cutaway top view 44. In the present embodiment, the cut outs 48 are in the form of radial holes distributed uniformly in at least one row 50 around the periphery of the top portion 26 of the brushing 24. The embodiment depicted in FIG. 2 illustrates two rows 50 and 52 of the radial holes 48. The use of these radial holes 48 in the present embodiment will become more apparent from the description supra.

Figure 4:
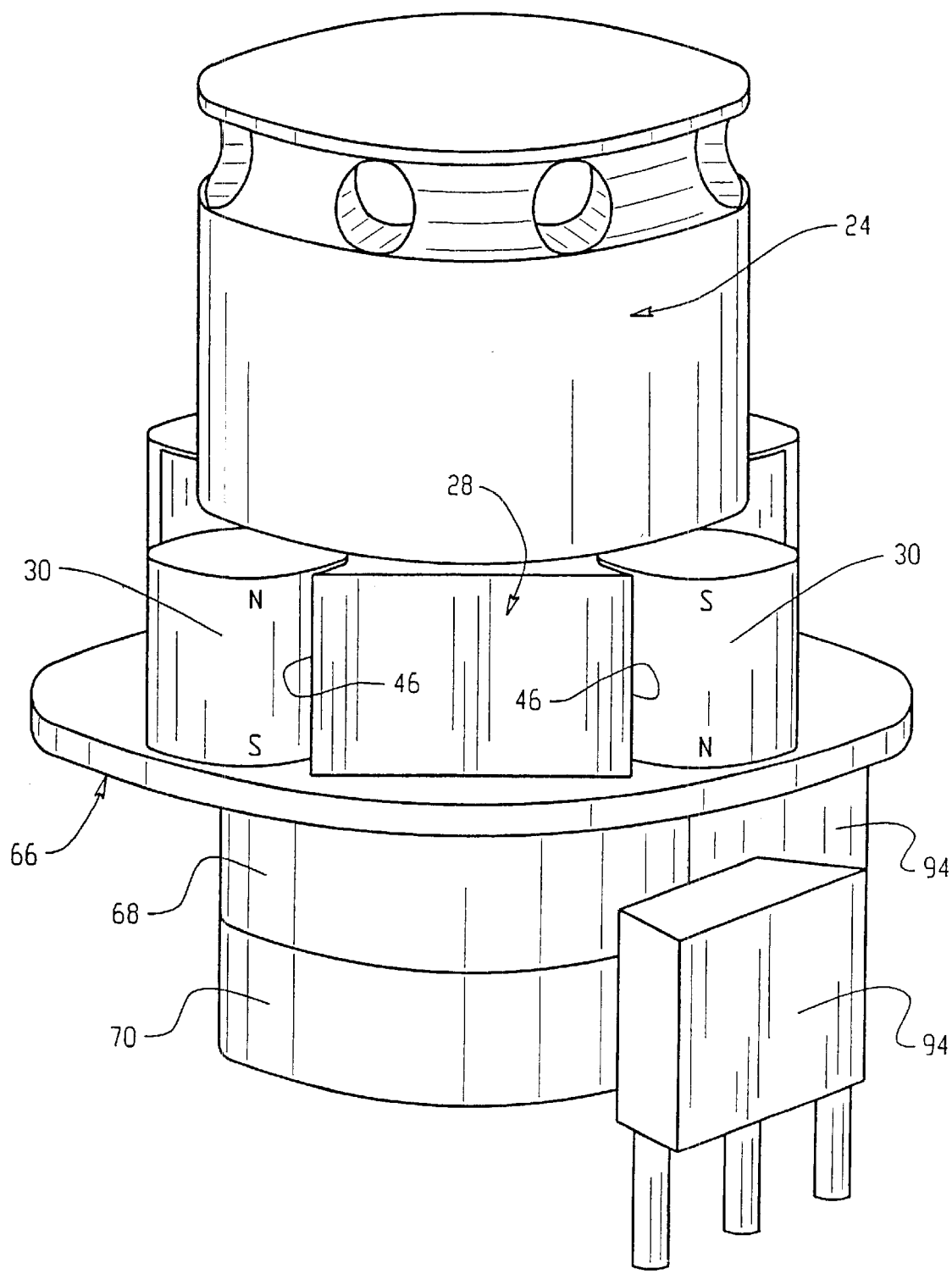
FIG. 4 is a prospective view of a bushing with permanent magnets affixed to cutouts thereof suitable for use in the embodiment of FIG. 1.

Referring to FIG. 4, perspective view of the bushing 24 is illustrated in which four permanent magnets 30 are affixed contiguously to each of four cut outs 46 in the bottom portion 28 thereof. In the present embodiment, the permanent magnets 30 are arranged around the periphery of the bottom portion 28 so that the North and South Poles thereof are axially aligned with the axis of the bushing in an alternating magnetic pattern around the periphery thereof. The permanent magnets 30 may be affixed to the cut outs 46 in the bottom portion 28 by an adhesive or the like. Referring back to FIG. 1C, the bottom portion 28 of the bushing 24 and its magnets 30 are disposed within the width of the flux washer 22 such that the permanent magnets 30 are held fixedly in axial position with respect to the housing 10 by magnetic attraction to the flux washer 22.

Figure 1D:
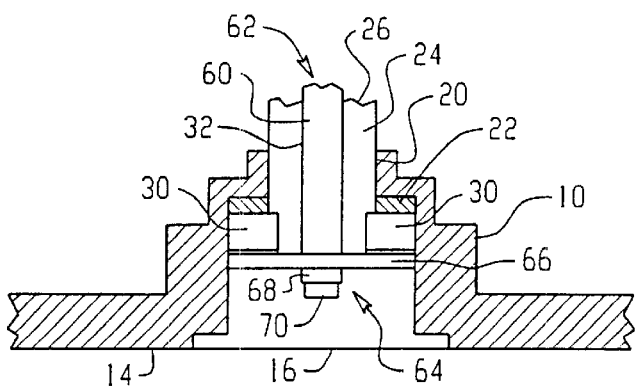

Next, as shown in FIG. 1D, a knob shaft 60 including a top portion 62 and a bottom portion 64 is assembled to the housing 10 and bushing 24. In the present embodiment the top portion 62 of the shaft 60 is disposed through the first opening 16, the cavity 18 and the bushing opening 32 to render the bottom portion 64 within the housing cavity 18. The bottom portion 64 includes a member 66 comprised of a magnetically attractive material, such as a Ferrous material, for example, that is held in place in juxtaposition with the bottom portion 28 of the bushing 24 by a magnetic attraction force of the permanent magnets 30 thereof. In other words, the member 66 of the shaft 60, the permanent magnets 30 and the flux washer 22 together form a complete magnetic connection. In the present embodiment as shown in FIGS. 1D and 4, a small gap, on the order of 0.005 inches, for example, is maintained between the magnets 30 and the member 66 in order to avoid rubbing, friction and general wear and tear of the magnets 30 as the member 66 is rotated across the bottom portion 28 of the bushing 24. Also, in the bottom portion 64 of the shaft 60, under the member 66 is a shaft layer 68 comprised of a non-ferrous or magnetically insulating material and under that is a small permanent magnet 70. The small permanent magnet 70 may be magnetized parallel to the diameter thereof and includes at least one set of North-South Poles which are transverse to the axis of the shaft 60. However, it is understood that the permanent magnet 70 may be magnetized in other orientations without deviating from the present invention.

Figure 3:
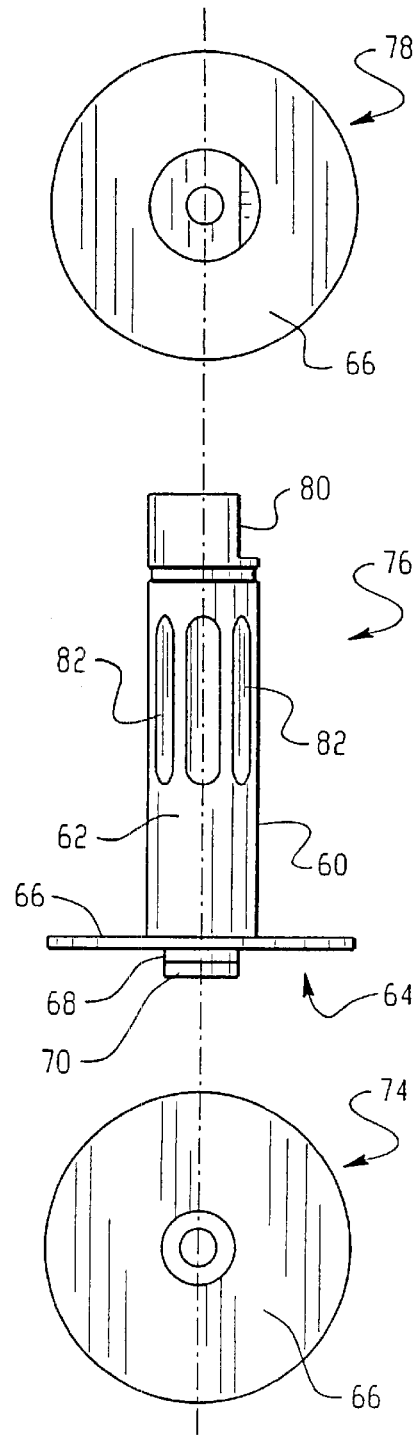
FIG. 3 depicts bottom, side and top views of a shaft suitable for use in the embodiment of FIG. 1.

The shaft 60 is shown in greater detail in the bottom 74, side 76, and top 78 views of FIG. 3. Referring to FIG. 3, at the very top of the shaft 60 is a member 80 which extends above the bushing 24 when the shaft is inserted through the opening 32 thereof (refer to FIG. 1D). The member 80 is shaped to accommodate a knob (not shown) for operating the encoder. It may be slotted, keyed or include a through-hole for a roll pin, for example. Also, the top portion 62 of the shaft 60 includes a plurality of axial grooves 82 disposed around the periphery thereof. The grooves 82 are positioned axially on the top portion 62 of the shaft 60 to be aligned with the radial holes 48 of the bushing 24 to provide a detent communicating mechanism therebetween. As shown in the perspective view of FIG. 5, ball bearings 84 are disposed in their respective radial holes 48 in the rows 50 and/or 52 of the top portion 26 of the bushing 24.

More specifically, the ball bearings 84 protrude radially through the holes 48 of the bushing 24 and come in contact with the axial grooves as the knob shaft 60 is rotated in the opening of the bushing 24. In the present embodiment, the ball bearings 84 are held in place in the radial holes 48 by O-rings 86 as shown in the perspective view of FIG. 6. The O-rings 86 both contain the balls 84 in the radial holes 48 and also apply an inward radial force on the balls 84 engaging them with the shaft and grooves 82. Accordingly, as the shaft is rotated in the opening 32 of the bushing 24 some of the ball bearings 84 will be forced into the slots 82 of the shaft causing a detent position.

In the present embodiment, the knob shaft includes nine grooves or slots 82, parallel to the shaft's axis of rotation and distributed uniformly around the periphery or circumference of the shaft 60. In addition, the bushing 24 has six radial holes per row 50 or 52 which are distributed uniformly around the circumference thereof. When the knob shaft 60 is in a detent position with the bushing 24, only three of the balls will be fully engaged in the slots 82 of the shaft 60. If the shaft is rotated one detent position in either direction, the other three balls will be engaged and the previous three balls will no longer be fully engaged. This combination generates 18 detent positions per revolution of the shaft, that is two ball sets times nine slots. If a higher knob rotation torque is required, another set of six balls can be added in another row, say 52, for example, thus doubling the torque. In addition, if a higher detent count is needed, the second row of six balls can be offset from the first row of six generating thirty-six detents per revolution, that is four ball sets times nine slots.

Returning now to FIG. 3, in the present embodiment, the member 66 of the bottom portion 64 of the shaft 60 is comprised of a ferrous material and is disc shaped having a diameter large enough to allow the disc member 66 to form a magnetic connection with the permanent magnets 30 of the bushing 24. The disc like member or shaft plate 66 is held in contact with the bottom 28 of the bushing 24 by the magnetic attraction force between it and the permanent magnets 30 in the cavity 18 of the housing 10 as shown in FIG. 1D and also in FIG. 4. In the present embodiment, the four permanent magnets 30 are of a high energy-product magnet type which may be comprised of a Samarium Cobalt material, for example. Accordingly, the disc or plate 66 is attracted to the permanent magnets 30 of the bushing 24 with a relatively high magnetic attraction force.

Figure 1E:
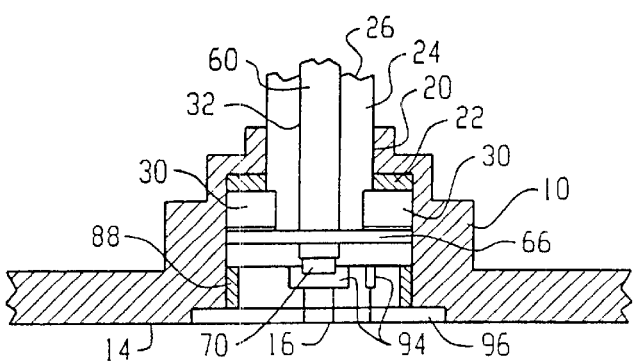

Referring to FIG. 1E, a stop member 88 may also be disposed in the housing cavity 18 to serve as a stop to the displacement of the shaft member 66. In the present embodiment, the member 88 is comprised of a ferrous material, like 066 cold rolled Steel, for example, and may be ring like in shape for insertion around the inner periphery of the cavity 18 to contain the magnetic field of the permanent magnet within the cavity 18 and act as a shield to any extraneous external magnetic fields.

Figure 7:
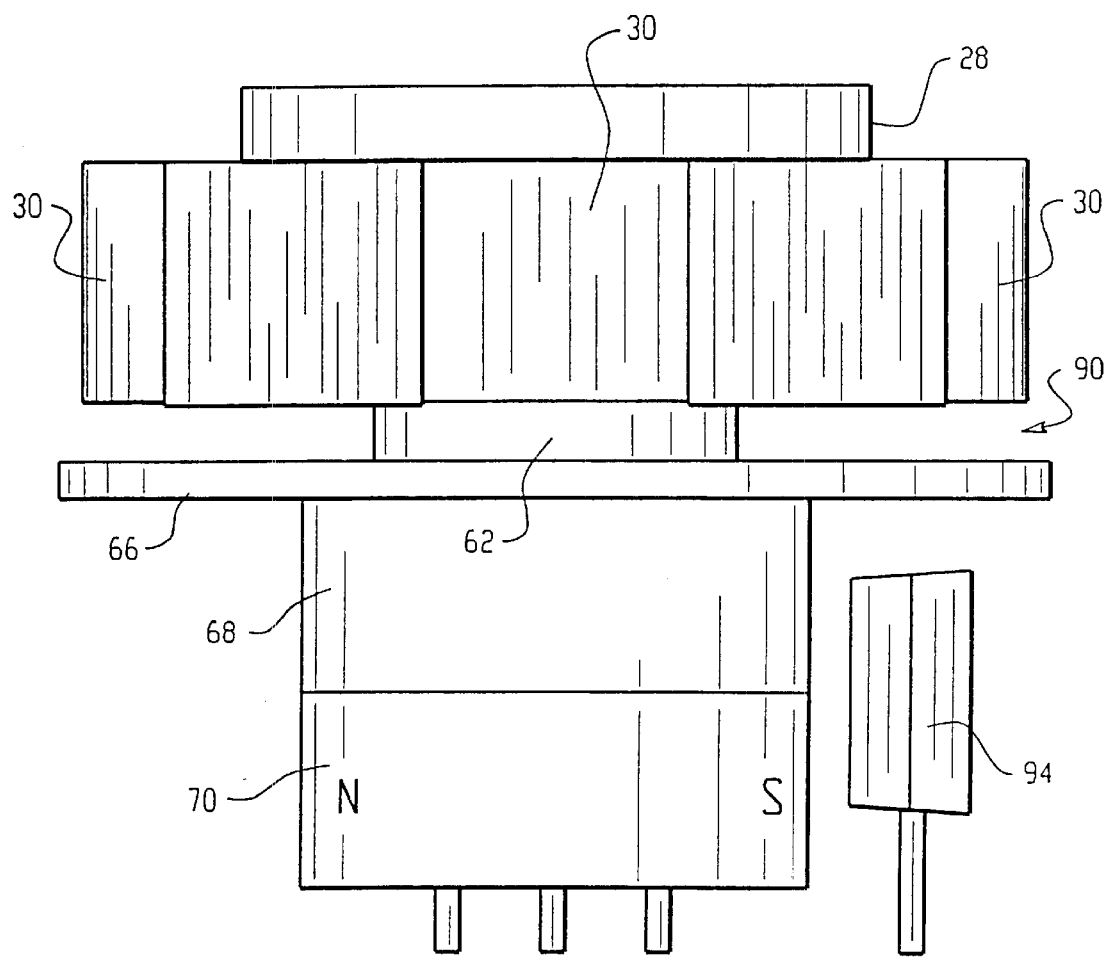
FIG. 7 is a prospective view of the encoder apparatus illustrating the operation of the embodiment of FIG. 1.

Thus, in operation, when an external force is applied to the top end of the knob shaft 60 to depress the shaft into the cavity 18 of the housing 10, the magnetic attraction force of the permanent magnets 30 on the shaft member 66 resists the depressive push on the shaft until the external force overcomes the magnetic attraction force or force threshold. Once the force threshold is reached, the knob shaft 60 slidably moves or is displaced downward in the opening 32, increasing the gap 90 between the permanent magnet 30 and shaft plate 66 such as that shown in the illustration of FIG. 7. As the gap 90 increases, the magnetic attraction or pull force of the permanent magnets 30 is reduced. Accordingly, the magnetic attraction force drops off with displacement, i.e. the gap 90, permitting the knob shaft to travel to a fully depressed position resulting in a "snap action" feel. When the external force on the knob shaft is released, the magnetic attraction or pull force generated by the permanent magnets 30 on the shaft 66 will snap the shaft back to its juxtaposed position with the bushing 24. That is, the shaft plate member 66 will be in full contact with the bushing portion 28 as shown in the illustration of FIG. 4.

While this aspect of the present invention is exemplified using a push switch embodiment as described hereabove, it is understood that by simply rearranging the switch elements that the same inventive principles will also apply to a pull switch. Moreover, while an attractive magnetic force is used in the exemplary embodiment described above, it is further understood that a repulsive magnetic force could be used just as well by a rearrangement of members without deviating from the principles of the present invention.

Referring back to FIG. 1E, the knob shaft 60 and its permanent magnet 70 are axially and/or rotatably moveable in the housing cavity 18. A plurality of magnetic field sensors 94 are disposed within the housing cavity 18 in proximity to the permanent magnet 70 of the shaft 60 and distributed angularly thereabout to sense the magnetic field strength of the permanent magnet 70 based on the orientation thereof with respect to the sensors 94. Each sensor 94 is capable of generating a signal representative of the magnitude of the magnetic field strength sensed thereby. In the present embodiment, two magnetic field sensors are distributed about the permanent magnet 70, ninety degrees apart. The magnetic field sensors 94 may include Hall Effect devices that may be fixed in their respective positions and orientations with respect to the permanent magnet 70 in the cavity 18, as illustrated in FIG. 1E and also in FIGS. 4 and 7, by their disposition on a printed circuit board 96 which may be affixed to the housing 10 at the opening 16 thereof as shown in FIG. 1E. While the sensors 94 are shown upright or vertical to the axis of the shaft 60, it is understood that other orientations thereof such as laying the sensors flat on the printed circuit board 96 will result in satisfactory sensor measurements in accordance with the principles of the present invention. In addition, while only two sensors are used for the present embodiment, it is also understood that more than two sensors may be distributed about the permanent magnet 70 for greater accuracy or redundancy, if desired, without deviating from the present invention.

Figure 8:
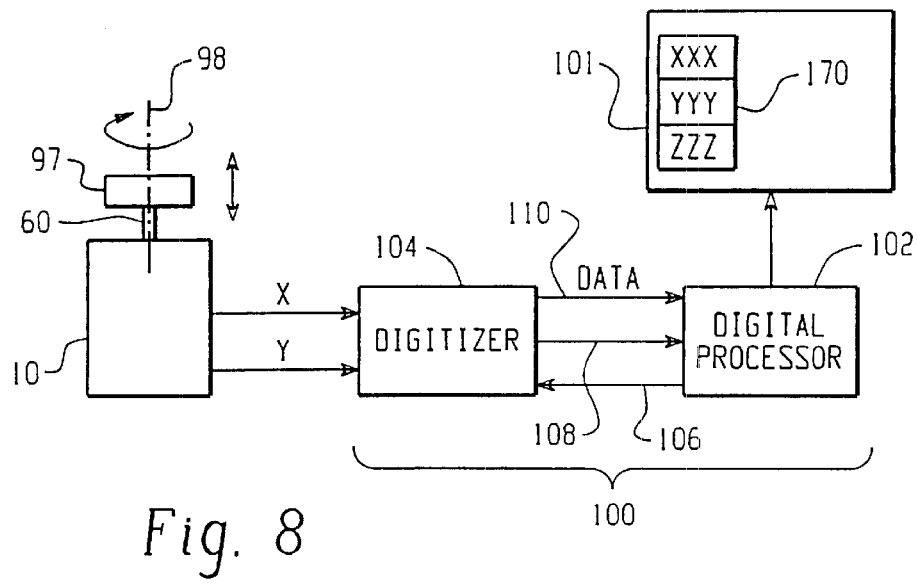
FIG. 8 is a block diagram schematic suitable for embodying one or more aspects of the present invention.

FIG. 8 is a block diagram schematic illustration of a multifunctional encoder apparatus employing the same aspects of the embodiment described in connection with FIGS. 1–7 hereabove. For example, the shaft 60 of the encoder mechanism may have affixed thereto a knob 97 which may be used to rotate the shaft 60 about its axis 98. In addition, the knob 97 may be depressed and released to cause the shaft to undergo axial movement along the axis 98 with respect to the encoder housing 10 as explained hereabove. The magnetic field strength of permanent magnet 70 is sensed by each of the sensors 94 and the resultant signals, depicted as X and Y, are output from the sensors 94 for processing by a processor 100. In the present embodiment, the sensor signals X and Y are analog and change in amplitude according to a sinusoidal waveform as the permanent magnet 70 is rotated through a 360° angular change. The sinusoidal amplitude envelopes of signals X and Y are 90° out of phase from each other throughout the 360° rotation of the magnet 70. In addition, the processor 100 may include a programmed digital processor 102, for example. Accordingly, the analog signals X and Y are digitized by a digitizer 104 in order to be processed in the digital processor 102.

It is understood that the present invention should not be limited to the use of a digital processor and it is clear to all those skilled in the pertinent art that an analog processor may be used just as well for performing the functions of the multifunctional encoder as described hereinbelow. Also, it is understood that any digitizer may be used for the processor 100 including that which is manufactured by Linear Technology bearing model no. LTC1598, for example. Also, the programmed digital processor 102 may be of the type manufactured by Texas Instruments bearing the model no. TMS320C31, for example. The digitizer 104 of the present embodiment may digitize the analog signals X and Y at predetermined time intervals as controlled by the digital processor 102 using the select and control lines 106 in a conventional manner. In the alternative, the digitizer 104 may be adjusted to autonomously sample and digitize the analog signals X and Y and interrupt the digital processor 102, over interrupt line 108 when the digitized sensor data is available. In either case, the digitized sensor data signals are provided to the digital processor 102 from the digitizer 104 over the data lines 110.

Figure 9A:
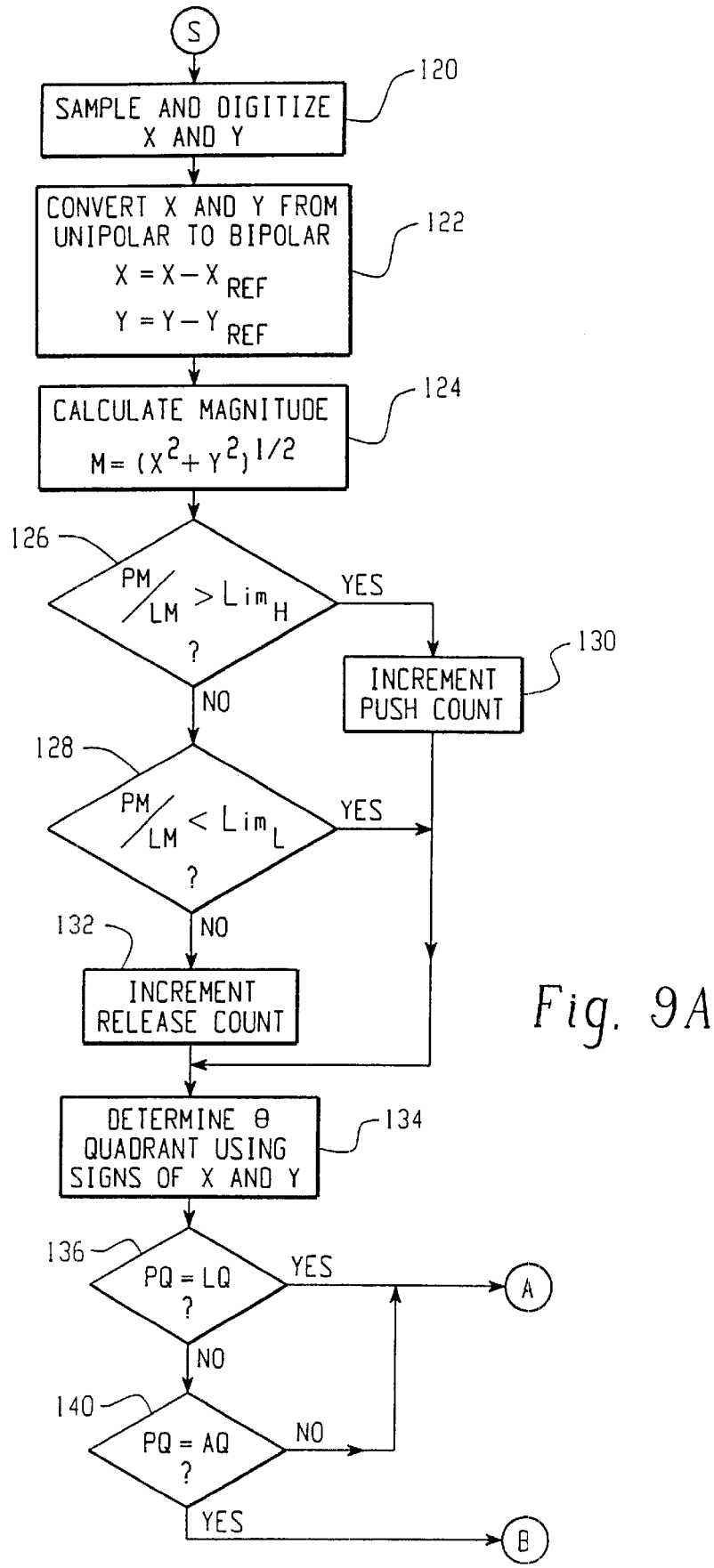
FIGS. 9A–9C depict a flow chart which is suitable for use in programming the digital processor of the embodiment of FIG. 8.
Figure 9B:
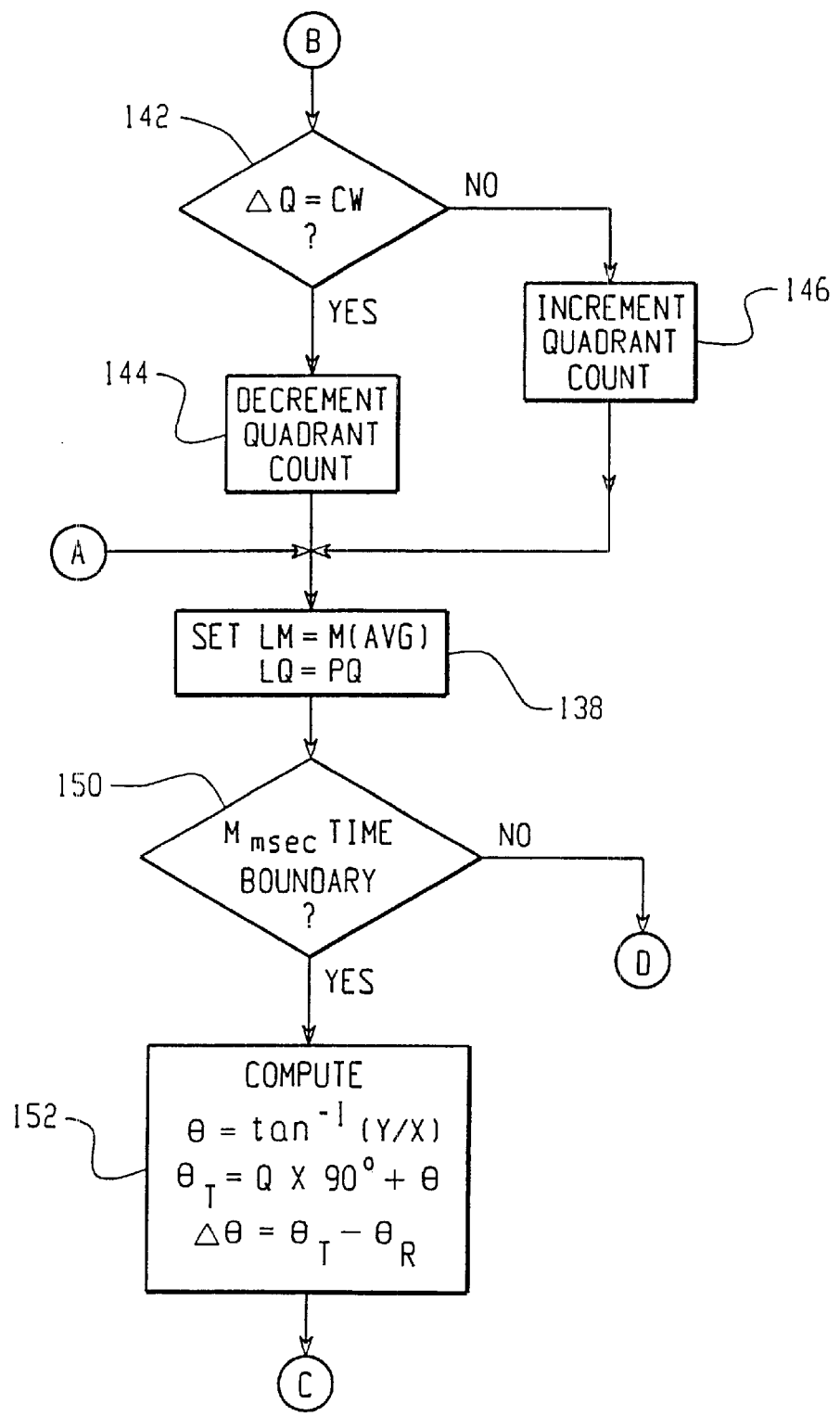
Figure 9C:
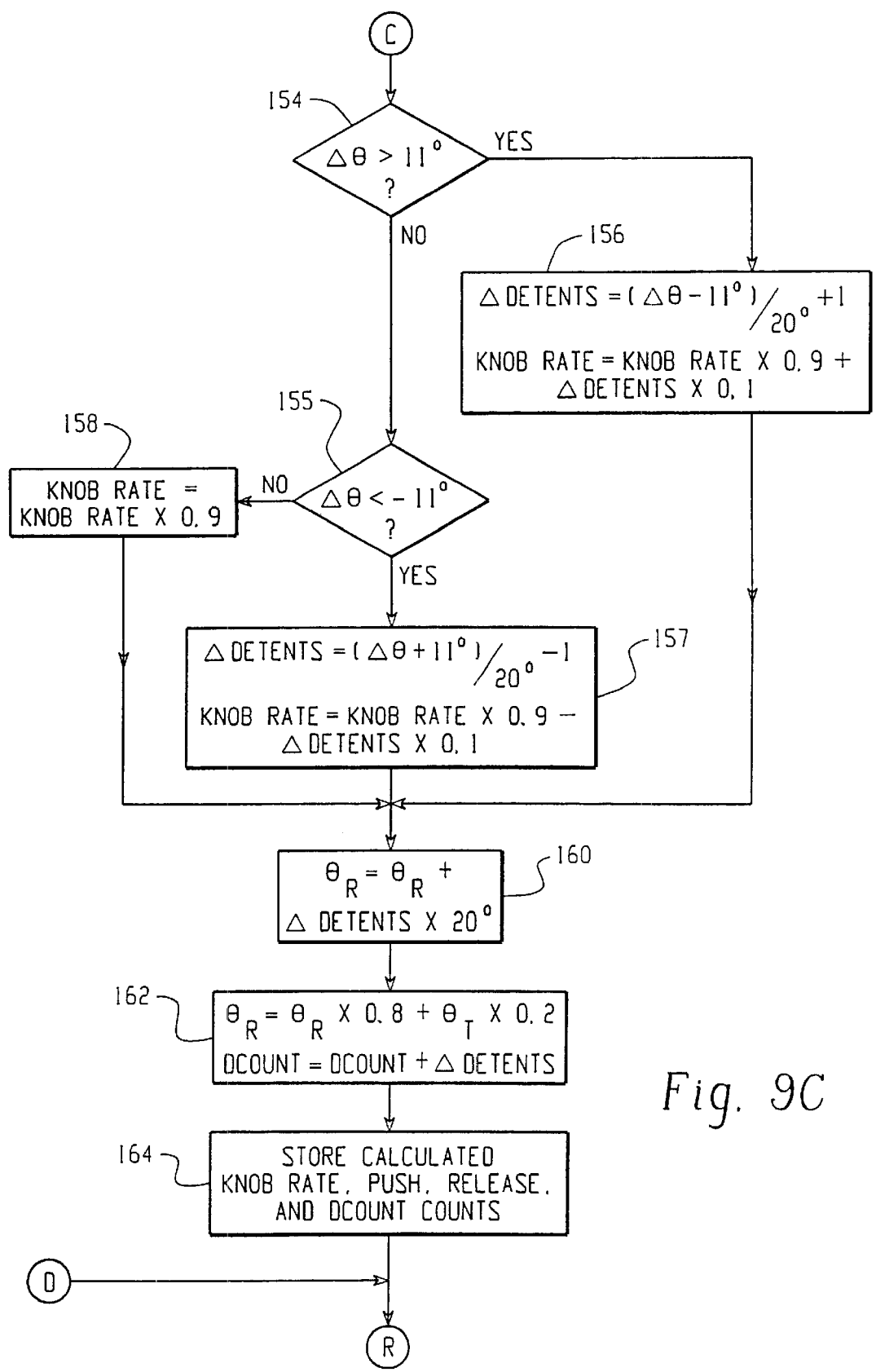

The processor 100 may be programmed for processing the sensor signals X and Y to independently resolve axial and rotational movement of the knob shaft 60 with respect to the housing 10. A flowchart suitable for use in programming the digital processor 102 is shown in FIGS. 9A through 9C. In the present embodiment, the routines of FIGS. 9A–9C are executed in the digital processor 102 every N milliseconds. Referring to FIG. 9A, program execution commences at the instruction block 120 which causes the digitizer 104 to sample and digitize the analog signals X and Y and store the digitized sensor data into appropriate designated registers of the digital processor 102. If the analog signals X and Y generated by the sensors 94 are unipolar with respect to a ground reference of the encoder system, for example, then, in block 122 the digitized signals X and Y are converted to bipolar data signals by offsetting each with an appropriate reference signal. Next, the magnitude of the magnetic field strength of the permanent magnet 70 in its present orientation with respect to the sensors 94 is calculated in block 124 by taking the square root of the sum of the squares of the digitized signals X and Y.

In the decisional blocks 126 and 128, the processor 102 determines axial movement of the shaft from a change in the magnetic field strength magnitude. This is accomplished in the present routine by comparing the ratio of the present magnitude PM and last magnitude LM to a set of high and low limits. If the ratio is greater than the high limits as determined by the decisional block 126, then the knob shaft is determined to have been depressed in the downward direction and as a result of this determination, a push count in a designated register of the digital processor 102 is incremented in block 130. On the other hand, if the ratio is determined to be below the lower limit by the decisional block 128, then the shaft 60 is determined to have been released and snapped back to its original state. Under this determined condition, a release count in a designated register of the digital processor 102 is incremented in block 132. If neither decisional block 126 nor 128 results in an affirmative decision, blocks 130 and 132 are by-passed and neither push count nor release count is incremented. Thereafter, programmed execution continues in block 134. Also, after execution of either block 130 or 132 is complete, program execution continues at block 134.

Figure 10:
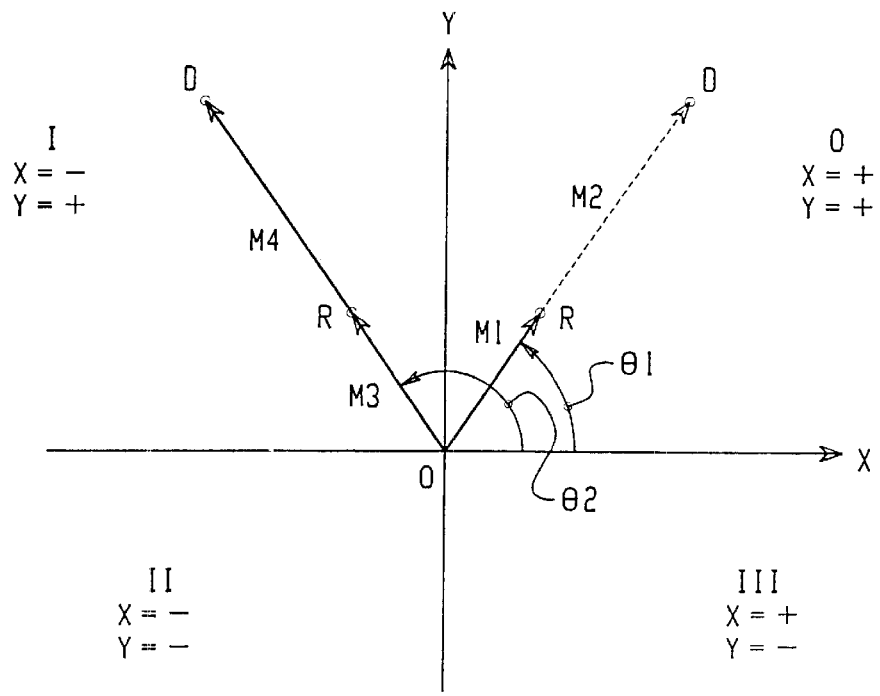
FIG. 10 is a graph which illustrates the operation of the encoder apparatus in accordance with the flow charts of FIGS. 9A–9C.

In block 134, the present quadrant of the rotational angle θ of the shaft is determined using the signs of the bipolar sensor signals X and Y. An explanation of this determination is provided with reference to the graphical illustration of FIG. 10. Note that if the signs of both X and Y are positive the rotational angle θ is in the quadrant 0 and if both are negative, θ is in the quadrant II. In addition, if X is negative and Y is positive, θ is in quadrant I and if the reverse is true than the rotational angle θ is in quadrant III. Thus, by looking at the signs of the digitized bipolar sensor signals, the present quadrant of the angle θ may be determined.

Returning back to FIGS. 9A–9C, if the present quadrant PQ is the same as the last quadrant LQ as determined by the Block 136, then the angle has not moved outside of its quadrant in N milliseconds and program execution continues at block 138. However, if it is determined in the decision of block 136 that PQ≠LQ, then the quadrant of angle θ has changed and the present quadrant is next determined. Decision block 140 determines whether or not the present quadrant is in an adjacent quadrant AQ to the last quadrant. If it is not, the program ignores the change and assumes no movement and execution continues at Block 138. Under this condition, a fault bit may be set to indicate a part failure or overspeed in the rotation of the shaft.

Should it be determined that the present quadrant is in an adjacent quadrant, then it is next determined by the decisional Block 142 whether the rotational angle has moved clockwise or counter clockwise. For example, if the last quadrant was 0 and the present quadrant is I, then the rotational angle is determined to have changed counter clockwise and as a result program execution is continued in program block 144 wherein a quad count in a designated register of the digital processor 102 is decremented. On the other hand, if the last quadrant is 0 and the present quadrant is III, then the change in quadrant of the rotational angle is determined to be clockwise whereupon program execution continues at block 146 wherein the quad count is incremented. Thereafter, program execution continues at block 138.

For bookkeeping purposes, block 138 sets LM to a moving average of the previously calculated magnitudes and sets LQ equal to PQ. Next, in block 150, it is determined if a M millisecond time boundary has been reached. Such a time boundary could be, for example, two or more of the N millisecond time intervals. If the decisional block 150 determines that the time boundary has been reached, then, in instruction block 152, the rotational angle θ is computed as the arc tangent of the ratio of the digitized sensor signals Y to X. Also, in block 152 a total rotational angle $\theta_T$ is calculated by multiplying the present quadrant number Q by 90° and adding to it the computed rotational angle θ. Also in 152, the change in rotational angle Δθ is calculated by subtracting from $\theta_T$ a reference angle $\theta_R$ which according to the present routine is the total rotational angle calculated during the last execution of the program routine or last execution of the block 152.

Next, in decisional blocks 154 and 155, it is determined whether or not Δθ is greater than some positive predetermined angle change or less than some negative predetermined angle change in order to determine if the current rotation has exceeded a detent position. In the present embodiment, since there are eighteen detent positions spaced uniformly 20° apart around the periphery of the knob shaft, the positive and negative predetermined angle changes are set respectively to 11° and −11°, which are slightly greater than one-half of the detent rotational angle increment of the present embodiment in clockwise and counterclockwise directions. It is understood that for other arrangements, the detent angular increment, and thus, the positive and negative predetermined angle changes, may be different.

If Δθ>11°, then a number of detent positions, ΔDetents, covered by the angle change Δθ is determined in block 156 by subtracting 11° from Δθ and dividing the difference by 20°, then adding a one to the result. Also in block 156, a knob rate is computed by multiplying the product of the current knob rate by 0.9 and adding to that result a product of ΔDetents and 0.1. If Δθ<−11°, then a number of detent positions, ΔDetents, covered by the angle change Δθ is determined in block 157 by adding 11° to Δθ and dividing the difference by 20°, then subtracting a one from the result. Also in block 157, a knob rate is computed by multiplying the product of the current knob rate by 0.9 and subtracting from that result a product of ΔDetents multiplied by 0.1. If Δθ is determined to be between 11° and −11°, then no new detent has been reached by the rotation, and only a new knob rate is determined in block 158 as the current knob rate multiplied by 0.9.

The knob rate term that is calculated in blocks 156 and 157 is a value that approximates the rate at which the knob is being turned, filtered with a low pass filter, i.e. 0.9×knob rate ±(ΔDetents×0.1). In the present embodiment, ΔDetents is used as a measure of the rate at which the knob is being turned. Thus, a large number of detents indicates a high rate of turning and accordingly, a small number of detents indicates a low rate of turning. In addition, the rate filtering can have a different time constant, i.e. different coefficients, for increasing and decreasing rates depending on user preferences. This knob rate term can be used by any system that uses the knob count, i.e. the count going through the detents, as an input to increase the gain of the knob count. For example, in a system where a user uses knob rotation as means of adjusting some parameter over a large range quickly yet have fine control, the knob rate is adjusted automatically to increase the "gain" of the knob count in block 156. At high rates of knob turning, the knob rate could be adjusted automatically in gain by a factor of three, for example, resulting in a count change per detent of three instead of one. However, at low rates of knob turning, the knob rate term is adjusted downward in block 157 resulting eventually in a gain of just one. If one knob is used for various user inputs, each user input mode can have its own filter and knob rate coefficients to optimize the user interface for each type of input.

After execution of either block 156, 157 or 158, the program continues at block 160 wherein a new reference angle $\theta_R$ is calculated by adding to the current $\theta_R$ the product of ΔDetents multiplied by 20°. Next, in block 162, in order to compensate for drift between a mechanical angular position and its corresponding magnetically measured position, a new $\theta_R$ is determined by adding the products of $(\theta_R \times 0.8)$ and $(\theta_T \times 0.2)$. In many systems, especially digital output type systems, alignment between the mechanical detent positions and the sensing system is critical. In optical systems, alignment of the optical reflective/absorptive material, the optical emitter/sensor and mechanical detent mechanism is crucial. If proper alignment is not achieved, shaft rotation can be erroneously detected and actual rotation may go undetected. Marginal alignment may result in erratic output when the system is subject to vibration.

Since the instant encoder embodiment utilizes a high resolution analog vector of x and y to sense the knob/shaft angle, alignment between the actual and measured detent positions is achieved in software by applying an offset to the reference angle. Most encoders have a mis-alignment at the shaft's zero degree point (mechanical zero is purely arbitrary) with the corresponding magnetically measured zero degree point. In the present embodiment, at system initialization, the reference angle $\theta_R$ is set to the current magnetically measured angle. In a perfect system, after initial "alignment", no further adjustments would be necessary. However, with errors in the mechanical detent mechanism, magnet, magnetic sensor alignment etc., the detents may not be exactly 20° apart and the magnetic angle may be distorted. To reduce the effects of these errors, the present embodiment provides for the angle reference slowly to drift to the current magnetic angle by the execution of block 162 through a number of cycles. If the knob/shaft is in any detent for a long enough period of time, the error is decayed to zero. Then, when the knob is rotated to the next detent, the angle error is only the error between the detents—not an accumulated error from previous detents. Also, when the reference angle drifts to the current magnetic angle, the system is highly immune to noise. The noise on the signal would have to be ~½ the angle between detents for erroneous detent count to occur. Likewise, as the system wears or the shaft friction increases such that it does not stop precisely at a detent, the system self-aligns preventing erroneous detent counts.

Also, block 162 accumulates the ΔDetents determined for the current execution cycle in a detent counter DCOUNT. Next, in block 164, the program stores in designated registers of the processor 102, the calculated knob rate, push, release and accumulated detent counts DCOUNT and other parameters calculated during the current execution cycle before returning to wait for the next execution cycle. Also, if the decisional block 150 determines that the time boundary between rough and fine computations has not been reached, then the instructional blocks 152-164 which perform the fine computations are by-passed and the program routine waits for the next execution cycle. Accordingly, in the present embodiment, the fine computations, which may be computational burdensome to the processor 102, are not conducted each execution cycle, but rather only during selected execution cycles in order to alleviate the processing burden on the processor 102.

When resolving the knob position, both rotationally and axially, there are two main issues to consider. First, the process should be executed often enough such that it does not miss any user inputs, and that it accurately represents the magnitude of the user input (it does not miss counting detents). Second, user feedback, such as a number on a display or display brightness should be updated fast enough that the user sees a direct response to his input. In the case of the second issue, updating the user feedback, the preferred update rate is considerably slower than that which is preferred in the first issue.

The exemplary software flowcharts depicted in FIGS. 9A through 9C contain two processes that address (1) keeping track of all knob changes, and (2) updating the user feedback. The first process is depicted in the blocks starting at "S" and continuing through block 150. In this process, a crude angular knob shaft position is determined by resolving angular position into quadrants using the signs of the x and y signals from the magnetic sensors. Also, the knob's axial position is determined by the square root of the sum of the squares of signals x and y. Alternately, the shaft position may be determined by the sum of the squares to reduce computational requirements. In this process, by using integer math, the computation time is minimized. The interval over which this process could be performed is a function of the maximum knob rotation rate. A minimum execution cycle rate can be calculated using the following equation $^{Interval}=15/$ RPM. For example, for an accurate track of a shaft rotating at 3000 RPM, the interval would be N=5 milliseconds.

The second process is depicted in the flowchart of FIG. 9C from block 152 to 162. In this second process, the shaft or knob angle is finely resolved within five degrees or better depending on system errors and calibration. The knob rate term is also calculated. The output of this process is used as the input to other processes, like display routines, for example, where the user may be adjusting a specific parameter such as a display brightness level. This process typically requires more computation than the first process since it involves the computation of an arctangent and the knob rate term with filtering. However, since a user update interval of M=50 mS or more is acceptable, this process will typically run once for every ten times process one runs.

Thus, it is shown that the processor may independently resolve the axial and rotational movement of the knob shaft based on the foregoing described program execution. An example of this independence of computed quantities is shown graphically by the illustration of FIG. 10. Referring to the graph of FIG. 10, suppose the encoder is in the undepressed state R at a rotational angle θ1 initially, and then depressed. Consequently, the magnetic field strength magnitude changes from M1 to M2 and the ratio, i.e. M2/M1, becomes greater than the upper limit threshold (refer to block 126). Thus, the processor 102 detects the axial movement and registers the new state D of the encoder. Then, for example, suppose the encoder is rotated from angle θ1 to angle θ2 while depressed. In this new state (D,θ2), the magnitude of the depressed shaft may not be exactly the same as it was before, i.e. M4≠M2. However, the ratio of the present magnitude to the last magnitude M1 will provide the same state, i.e. the depressed state. Accordingly there is no change in the state of the axial movement. However, there is registered a change in rotational movement from θ1 to θ2. Now, suppose while in the state of θ2, the shaft is released and returns to the magnitude M3. Even though the magnitude M3 may be slightly different from M1, the processor still detects the ratio of M3/M4 to be below the lower threshold and determines the axial state to be the release state R. In this manner, the processor 102 may determine the axial movement of the shaft of the encoder independent of the rotational movement and vice versa.

Figure 11:
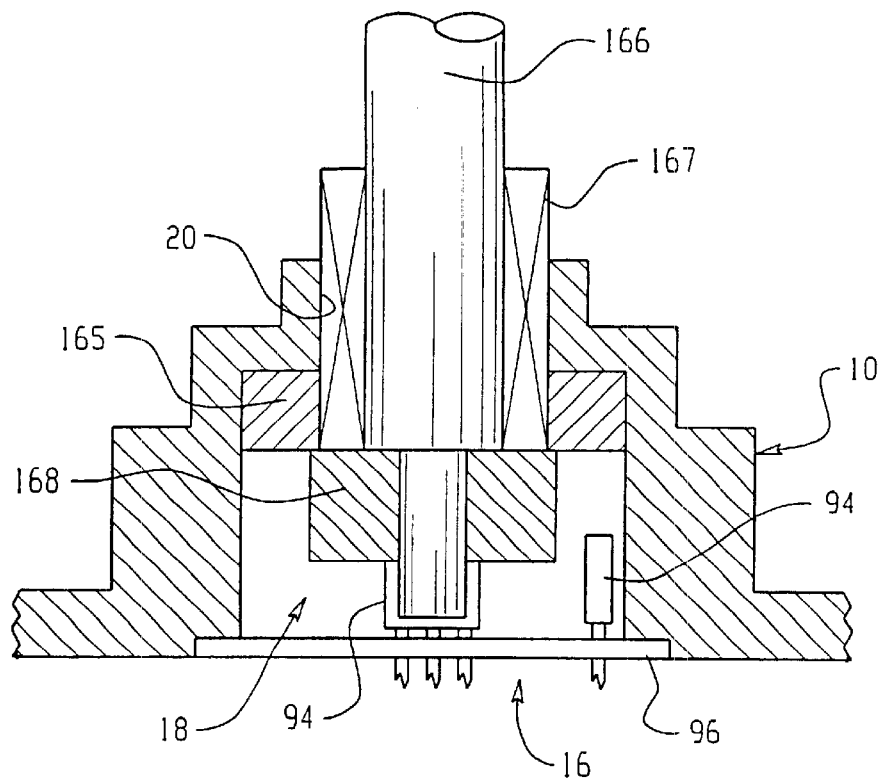
FIG. 11 is a cross-section view of an encoder apparatus suitable for embodying another aspect of the present invention.

In FIG. 11 is depicted a cross sectional illustration of an alternate embodiment of the present invention. Referring to FIG. 11, a member 165 of a ferrous material is disposed in the housing cavity 18 against the upper wall thereof. The member 165 may be a ferrous backing plate, for example, and inserted into the cavity 18 through the opening 16 of the housing 10 and press fitted into the upper wall thereof. A shaft member 166 of a non-ferrous material is slidably disposed in the opening 20 of the housing 10 rendering a bottom portion thereof in the cavity 18. In the housing opening 20, between the shaft 166 and housing 10 is disposed a sleeve bearing 167 which extends into the cavity 18 and separates the non-ferrous shaft 166 from the ferrous backing plate 165. Attached to the bottom portion of the shaft 166 is a permanent magnet 168 which, for the present embodiment, may be a ring magnet having one or more pole pairs, for example, and disposed about the periphery of the bottom portion of the shaft 166. The shaft 166 is held axially in place at the bottom of the bearing 167 by the magnetic attraction force between permanent magnet 168 and the backing plate 165 in the housing cavity 18. In the present embodiment, the permanent magnet 168 is of a high energy-product magnet type which may be comprised of a Samarium Cobalt material, for example. Accordingly, the permanent magnet 168 of the shaft 166 is attracted to the backing plate 165 with a relatively high magnetic attraction force.

Thus, in operation, when an external force is applied to the top end of the knob shaft 166 to depress the shaft into the cavity 18 of the housing 10, the magnetic attraction force between the permanent magnet 168 on the shaft member 166 and the backing plate 165 resists the depressive push on the shaft until the external force overcomes the magnetic attraction force or force threshold. Once the force threshold is reached, the knob shaft 166 slidably moves downward in the sleeve bearing 167 and is displaced axially from its magnetically held position, producing a gap between the permanent magnet 168 and backing plate 165 in the cavity 18. As the gap increases, the magnetic attraction or pull force of the permanent magnet 168 is reduced. Accordingly, the magnetic attraction force drops off with displacement, i.e. the gap, permitting the knob shaft 166 to travel to a fully depressed position resulting in a "snap action" feel. When the external force on the knob shaft is released, the magnetic attraction or pull force generated by the permanent magnet 168 with the plate 165 will snap the shaft back axially to its juxtaposed position against the sleeve bearing 167.

While this aspect of the present invention is exemplified using a push switch embodiment as described hereabove, it is understood that by simply rearranging the switch elements that the same inventive principles will also apply to a pull switch. Moreover, while an attractive magnetic force is used in the exemplary embodiment described above, it is further understood that a repulsive magnetic force could be used just as well by a rearrangement of members without deviating from the principles of the present invention.

According to another aspect of this alternate embodiment, the knob shaft 166 and its permanent magnet 168 are axially and/or rotatably moveable in the housing cavity 18. The plurality of magnetic field sensors 94 are similarly disposed within the housing cavity 18 in proximity to the permanent magnet 168 of the shaft 166 and distributed angularly thereabout to sense the magnetic field strength of the permanent magnet 168 based on the orientation thereof with respect to the sensors 94. Each sensor 94 is capable of generating a signal representative of the magnitude of the magnetic field strength sensed thereby. In the present embodiment, two magnetic field sensors are distributed about the permanent magnet 168, ninety degrees apart. The magnetic field sensors 94 of this embodiment may also include Hall Effect devices that may be fixed in their respective positions and orientations with respect to the permanent magnet 168 in the cavity 18 as illustrated in FIG. 11, by their disposition on the printed circuit board 96 similarly affixed to the housing 10 at the opening 16. The printed circuit board 96 may also act as a bottom stop to the shaft 166 as it is displaced from its magnetically held position by an external force. While the sensors 94 are shown upright or vertical to the axis of the shaft 166, it is understood that other orientations thereof such as laying the sensors flat on the printed circuit board 96 will result in satisfactory sensor measurements in accordance with the principles of the present invention. In addition, while only two sensors are used for the present embodiment, it is also understood that more than two sensors may be distributed about the permanent magnet 168 for greater accuracy or redundancy, if desired, without deviating from the present invention. Accordingly, this alternate embodiment may also be used as a suitable switch for the multifunctional encoder apparatus described in connection with FIG. 8.

In another aspect of the present invention, the multifunctional encoder as described hereinabove may operate as a controller for a display. In one embodiment of this aspect, as shown in FIG. 8, the digital processor 102 may control a display 101. In this embodiment, the digital processor 102 may respond to the press, rotate and release actuations of the encoder to provide control signals to the program routines for the display 101. In this regard, reference is made to the program routines of FIGS. 9A and 9B. For example, when the encoder is depressed as determined by the decisional block 126 a push count is incremented in block 130. For the display controller the incrementing of the push count may be a flag or signal to control the display program routines to display a certain menu like that shown at 170 in the display 101. While in this depressed state, if the encoder shaft is rotated through a predetermined incremental angle change as determined, for example, by block 154, then a detent count is altered which may be a flag or a control signal to the display program routines to scroll through the menu until the display results in a desired menu item. Thereafter, to select the menu item the encoder shaft is merely released. The release of the shaft is detected by the decisional block 128 which increments the release count in block 132 which may be a flag or a control signal to the display program routines to select that menu item.

Figure 8A:
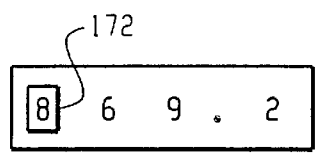

Also, as a display controller, the multifunctional encoder may be used to enter a numeric value through the display 101. For example, suppose the numeric value as depicted in FIG. 8A is displayed on the display 101 in response to the press, rotate and release functions of the multifunctional encoder. Once the numeric value is present and selected, then the value may be changed based again on additional press, rotate and release actuations of the encoder. For example, a depression of the shaft 60 may cause the selection of one of the digits in the numerical value such as shown by the boxed digit in FIG. 8A. Once selected, the boxed digit may be incremented or decremented based on a rotation of the encoder shaft as determined by for example decisional blocks 155 and 156. If the change in angle rotation Δθ is in a clockwise direction, the number of detents determined in block 156 could be utilized as a flag or a control signal to the display program routines to increase the value accordingly. Thus, the value may continue to be increased as the rotational angle of the shaft moves clockwise through one or more detents, for example. Likewise, the selected digit may be decreased by rotating the shaft counterclockwise through one or more detents as determined by the instructional block 157 which could be utilized as a flag or a control signal to the display program routines to decrease the digit accordingly. Once the desired digit value is achieved, the shaft may be released and depressed again to allow the next digit to be boxed and changed in value. For a rough rather than a fine change, the quadrant changes as determined by blocks 142, 144 and 146 may be similarly utilized for increasing or decreasing a numeric value. In this manner, the multifunctional decoder may be used to enter numeric values as well as navigate menus of a different variety.

Figure 5:
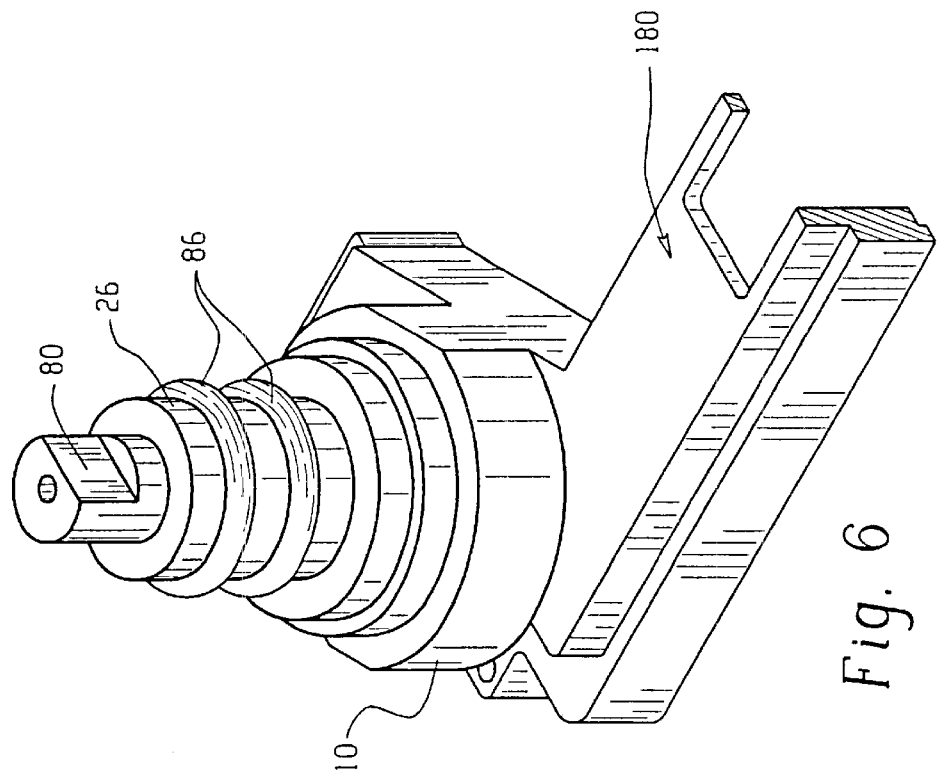
FIG. 5 is an illustrative prospective view of the encoder apparatus a detent mechanism suitable for use in the embodiment of FIG. 1.
Figure 6:
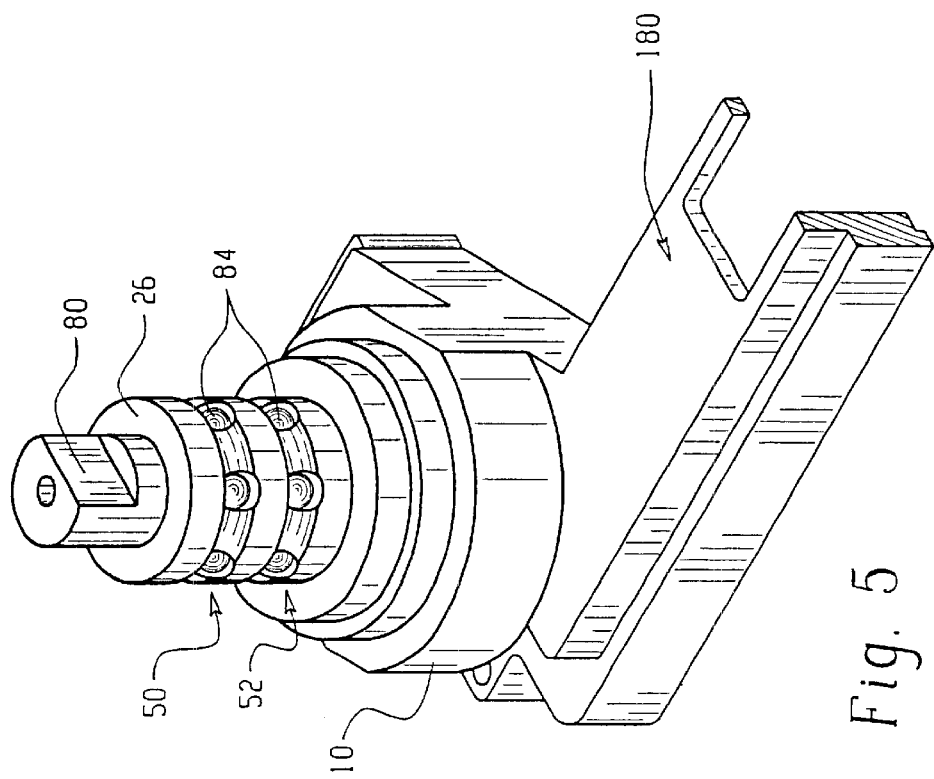
FIG. 6 is another illustrative prospective view of the encoder apparatus showing another aspect of the detent mechanism suitable for use in the embodiment of FIG. 1.
Figure 12:
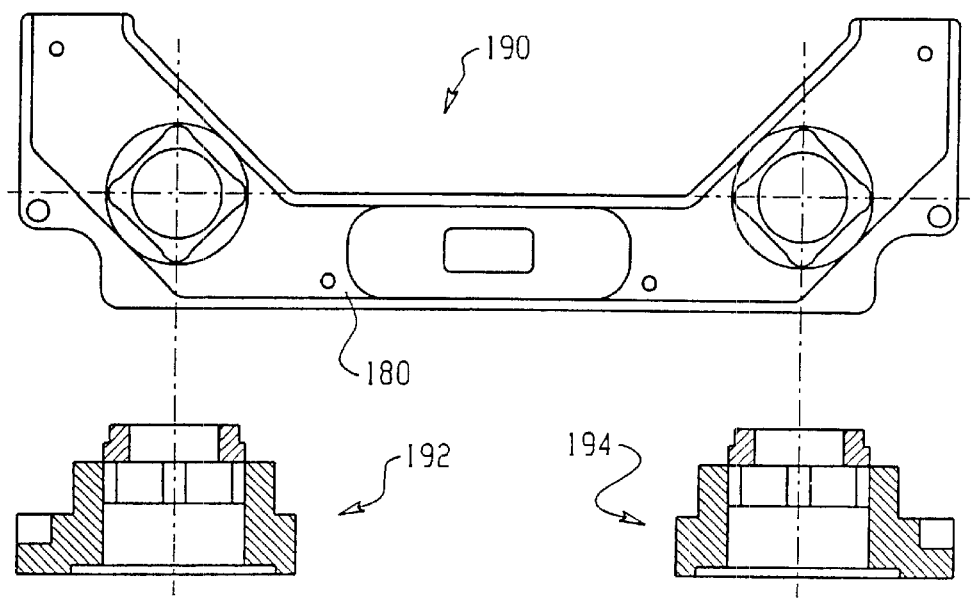
FIG. 12 depicts a top view and cross-sectional side views of a display bezel including two encoder assemblies suitable for use in embodying yet another aspect of the present invention.

In one embodiment of the multifunctional encoder used as a display controller, at least one multifunctional encoder is disposed at a bezel 180 of the display 101 as shown in the perspective views of FIGS. 5 and 6. In this embodiment, the housing of the at least one multifunctional encoder is integral to the bezel 180 of the display. In an alternate embodiment of the display controller aspect, the display bezel 180 may include two multifunctional encoders, one disposed on each side, which is illustrated by the top view 190 and side views 192 and 194 of FIG. 12. Each multifunctional encoder for this alternate embodiment may be the same as or equivalent to that described hereinabove. In other words, the digitizer 104 and digital processor 102 can accommodate the sensor signals of one or more additional multifunctional encoders and the program routine for each would be the same as or equivalent to that described in connection with the flowcharts of FIGS. 9A through 9C. It is understood however that the control signal generations of one multifunctional encoder may cause the display program routines to perform one set of functions and the control signals resulting from the actuations of another multifunctional encoder may result in control signals that cause the display program routines to perform another set of functions. However, the principals of the present invention remains substantially the same and keeping track of these different display functions is merely a software bookkeeping endeavor.

While the various aspects of the present invention have been described in connection with the embodiments described hereinabove, it is understood that the present invention should not be limited to any specific embodiment but rather construed in breadth and broad scope in accordance with the set of claims appended hereto.

What is claimed:

1. A switch with magnetic snap action comprising:
 a housing having top and bottom sides and a cavity, said housing including an opening on the top side that extends to said cavity;
 at least one permanent magnet fixedly disposed with respect to said housing in said housing cavity;
 a bushing comprising a top portion disposed in the housing opening, and a bottom portion that is disposed in the housing cavity and including the at least one permanent magnet attached thereto, said bushing including a hollow opening centrally located and extending axially therethrough; and
 a knob shaft including a top portion that is slidably disposed through said bushing opening, and a bottom portion disposed in the housing cavity and including a member comprised of magnetically attractive material, said knob shaft being held axially in a first position by a magnetic force between said shaft member and said at least one permanent magnet, said knob shaft being displacable from said first position for as long as said magnetic force is overcome by an external force applied to said knob shaft, whereby upon release of said external force, said knob shaft snapping back to said first position by said magnetic force.

2. The switch of claim 1 wherein the knob shaft is slidably and rotatably disposed in said bushing opening; and wherein the knob shaft and bushing include a detent communicating mechanism therebetween to permit the knob shaft to be rotated from one detent position to another in the opening of the bushing.

3. The switch of claim 2 wherein the detent communicating mechanism includes a plurality of ball bearings disposed about the periphery of the bushing and protruding radially through the wall of the bushing to be aligned axially with a plurality of axial grooves on the peripheral surface of the knob shaft, said ball bearings rendering detent positions when at least one of said ball bearings come in contact with at least one of the axial grooves as the knob shaft is rotated in the opening of the bushing.

4. The switch of claim 3 wherein the bushing includes at least one row of ball bearings uniformly spaced about its periphery.

5. The switch of claim 3 wherein the knob shaft includes more grooves than there are ball bearings disposed about each row of the bushing.

6. The switch of claim 1 wherein the at least one permanent magnet includes a plurality of permanent magnets; wherein the bottom portion of the bushing includes a plurality of cutouts uniformly spaced around the periphery thereof to accommodate said plurality of permanent magnets; and wherein the shaft member is disc shaped with a flat surface thereof in juxtaposition with the bottom portion of the bushing and a diameter extending to at least the permanent magnets of the bottom portion of the bushing so that said flat surface is in magnetic contact with the plurality of permanent magnets.

7. The switch of claim 6 including a second member of magnetically attractive material disposed annularly between the permanent magnets of the bottom portion of the bushing and the housing cavity and affixed to the housing cavity; and wherein the permanent magnets are affixed to the bottom portion of the bushing and are held in axial position with respect to the housing by magnetic attraction to said second member.

8. The switch of claim 7 wherein the second member includes a flux washer of ferrous material.

9. The switch of claim 6 wherein the permanent magnets are arranged so that the North and South poles thereof are axially aligned with the bushing in an alternating pattern around the periphery thereof.

10. The switch of claim 1 including a stop member disposed in the housing cavity to limit displacement of the knob shaft away from the first position.

11. The switch of claim 10 wherein the stop member includes a flux ring affixed around the inner periphery of the housing cavity.

12. The switch of claim 1 wherein the housing includes another opening on the bottom side that opens into the cavity to permit assembly of the elements of the switch to the housing.

13. A switch with magnetic snap action comprising:
 a housing having top and bottom sides and a cavity, said housing including an opening on the top side that extends to said cavity;
 a plate of magnetically attractive material fixedly disposed at an inside periphery of said housing cavity;
 a knob shaft including a top portion that is slidably disposed through said housing opening, and a bottom portion disposed in said housing cavity and including a permanent magnet, said knob shaft being held axially in a first position with respect to said housing by a magnetic force between said permanent magnet and said plate, said knob shaft being slidably displacable from said first position for as long as said magnetic force is overcome by an external force applied to said knob shaft, whereby upon release of said external force, said knob shaft snapping back to said first position by said magnetic force; and a sleeve bearing disposed between the knob shaft and housing in the housing opening, said sleeve bearing extending into the housing cavity around the periphery of the knob shaft; wherein the plate is disposed between the sleeve bearing and housing in the housing cavity.

14. The switch of claim 13 wherein the knob shaft is comprised of a non-ferrous material.

15. The switch of claim 13 wherein the plate comprises a backing plate of ferrous material that is disposed around the inside periphery of the housing cavity.

16. The switch of claim 13 wherein the permanent magnet includes a ring magnet disposed around the bottom portion of the knob shaft.

17. The switch of claim 13 wherein the plate includes a backing plate of ferrous material that is disposed between the sleeve bearing and housing in the housing cavity; and wherein the permanent magnet includes a ring magnet disposed around the bottom portion of the knob shaft below the sleeve bearing and in juxtaposition with the backing plate.

* * * * *